United States Patent [19]

Dombrowski et al.

[11] 4,116,094

[45] Sep. 26, 1978

[54] METHOD AND APPARATUS FOR CENTERING A WHEEL SET

[75] Inventors: Theodor Dombrowski; Helmut Wittkopp, both of Erkelenz, Fed. Rep. of Germany

[73] Assignee: Wilhelm Hegenscheidt Gesellschaft mbH, Erkelenz, Fed. Rep. of Germany

[21] Appl. No.: 795,428

[22] Filed: May 10, 1977

[30] Foreign Application Priority Data

May 12, 1976 [DE] Fed. Rep. of Germany ....... 2621050

[51] Int. Cl.² .................... B23B 5/28; B23B 13/00
[52] U.S. Cl. ........................................... 82/8; 82/2.5
[58] Field of Search ...................................... 82/8, 2.5

[56] References Cited

U.S. PATENT DOCUMENTS

| 1,567,705 | 12/1925 | Burt | 82/8 |
|---|---|---|---|
| 3,073,185 | 1/1963 | Hoffmann | 82/8 |
| 3,256,754 | 6/1966 | Rivierre et al. | 82/8 |
| 3,267,581 | 8/1966 | Bassoff | 82/8 |
| 3,323,397 | 6/1967 | Ladoues et al. | 82/8 |
| 3,490,319 | 1/1970 | Feld | 82/8 |

FOREIGN PATENT DOCUMENTS

| 1,087,429 | 8/1960 | Fed. Rep. of Germany | 82/8 |
|---|---|---|---|
| 874,978 | 4/1953 | Fed. Rep. of Germany | 82/8 |
| 1,059,560 | 2/1967 | United Kingdom | 82/8 |
| 385,878 | 1/1933 | United Kingdom | 82/8 |

Primary Examiner—Harrison L. Hinson
Attorney, Agent, or Firm—Michael J. Striker

[57] ABSTRACT

A method for centering the wheels of a two wheel set with the centerline extending between the dead centers of a machining-, measuring-, or testing-apparatus, in which each wheel of the set is lifted by a separate lifting device and in which the position of each wheel during its lifting is sensed by a separate sensing device, coordinated with the respective lifting device, to stop further lifting movement of the respective lifting device when the center of the respective wheel coincides with the centerline of the apparatus, to thus properly align the centers of the wheels of the two wheel sets with the centerline of the apparatus regardless of any difference of the diameters of the two wheels or any asymmetrical loading on the axle of the wheel set; and an apparatus for carrying out the method.

11 Claims, 9 Drawing Figures

METHOD AND APPARATUS FOR CENTERING A WHEEL SET

BACKGROUND OF THE INVENTION

The present invention relates to a method for centering the wheels of a two wheel set with the centerline extending between dead centers of a machining-, measuring-, or testing-apparatus by means of a lifting arrangement.

The present invention relates further to an apparatus for carrying out the method.

Wheel set turning machines are for instance known by the DT-PS No. 1,270,361 or the DT-PS No. 1,477,587 in which a wheel set to be reprofiled is lifted off the rails and moved upwardly by a single device arranged centrally between the rails. A single centralizing arrangement, provided either adjacent the head stock or the tail stock of the wheel set turning machine, is used which shall assure that the lifting device, lifting the wheel set, positions the latter in such a manner that the centers of the two wheel coincide with the centerline of the machine extending between the dead centers of the head and tail stock, so that the dead centers of the wheel set turning machine may exactly engage into the conical center bores of the wheel set shaft to thus centralize the wheel set. After the wheel set has been received between the dead centers of the wheel set turning machine, entrainment means are engaged with the wheel set and the lifting device is again lowered. In practice it has however been shown that the positioning of wheel sets with the known devices cannot be carried out with the required exactness. With the known devices, the wheel sets to be reprofiled are positioned relative to the centerline of the machine too high, too low or inclined to the centerline. This will result in considerable damage of the conical center bores in the wheel set axle, whereby subsequent thereto remachining of these center bores will be necessary, and to a faulty gripping of the wheels of the wheel set. Such a faulty gripping of the wheel set will result that the wheels of the set will subsequently be reprofiled with a wrong distance between the wheels and a distorted profile.

An inclined position of the wheel set will result when asymmetrical loads act on the axle of the wheel set to be machined. Such asymmetrical loads may for instance result from drive motors or gearings connected to the axle of the wheel set. At such an asymmetrical load distribution, the central lifting device and the lateral arms thereof are likewise asymmetrically loaded, which results in a bending of the lifting cylinder and the arms thereof. A further cause of the inclined position of the wheel set is the difference between the diameters of the two wheels of the set which may be rather considerable at the tread surface as well as at the wheel flange. If perchance the wheel with the smaller diameter is located on the side of the wheel set on which the greater load acts, then these two features will be added to each other to contribute to the error producing an inclined position of the wheel set axis. If now the centralizing device is also located on the mentioned side of the wheel set turning machine, then the wheel set will be lifted by the lifting device controlled by the centralizing arrangement until the smaller diameter wheel located on the heaver side of the wheel set is exactly centrally positioned. In this position the lifting device is stopped. However, on the other side of the wheel set the conical center bore will be much too high, so that during movement of the dead centers into the center bores, contact along only a small surface will initially result at the higher side of the wheel set. The dead center of the wheel set turning machine moves now forceably into the conical center bore and produces thereby, due to its small surface contact, a deep groove in the latter and pushes the wheel set against the force of the lifting device downwardly, whereby the axis of the wheel set will be simultaneously elastically bent so that the wheel on this one side will assume an inclined position. The wheel is now received and held in this inclined position by the clamps on the face plate, so that this wheel will tumble during the reprofiling thereof.

A wheel set measuring apparatus is disclosed in the DT-PS No. 1,142,184 in which likewise the problem exists to position the wheel set as exactly as possible along the centerline of the apparatus, even though the wheels after the centralizing thereof are not engaged by entrainment means and fixed in their respective positions. The mentioned German patent suggests to lift each wheel of the wheel set to be positioned with a separate lifting device, whereby in order to assure a synchronous movement of the lifting devices the same amount of oil is simultaneously fed to the same. The pressure conduits of the lifting cylinders of the lifting devices are thereby connected with pressure accumulators. The elevation at which the wheel set has to be lifted is also in this construction determined solely by a single centralizing device which engages only one of the wheels of the set. Thereby differences of the diameters of the wheels of the set and an inclined position of the axis thereof will not be taken into account, so that centralizing errors will result. The two lifting devices have then the task, when the wheel set is brought into its central position, to relieve the dead centers from the wheel set weight. At an asymetrical load the lifting devices can likewise not accomplish the centralizing task, because at each lifting device a different pressure will result, due to the different weight of the portion of the wheel set resting thereon, so that the pressure accumulators connected to the pressure conduits will be filled in a different manner. Since however both lifting devices are supplied with the same oil volume, the higher loaded lifting device will necessarily start later. This will result under certain circumstances to a dangerous inclined position of the wheel set.

With the means known in the art it is therefore not possible to properly centralize the axis of a wheel set with the centerline of a machining-, measuring-, or testing-apparatus.

SUMMARY OF THE INVENTION

It is therefore an object of the present invention to provide a method to position a wheel set, regardless of any difference of the diameters of the individual wheels and regardless of any asymmetrical loading of the wheel axle, in such a manner in a machining-, measuring-, or testing-apparatus, so that it may be properly taken over by the centralizing elements of the apparatus. The term "centralizing elements" shall encompass not only dead centers provided on the head stock and tail stock of the machine, but also for instance self-centering chucks provided thereon.

With these and other objects in view, which will become apparent as the description proceeds, the method according to the present invention for centering the wheels of a two-wheel set with the centerline extending between centralizing elements of a machining-, measuring-, or testing-apparatus in which each wheel of the set is lifted by a separate lifting device, wherein the proper and position of each wheel is sensed by a separate sensing device coordinated with the respective lifting device, to stop further lifting movement of the respective lifting device when the center of the respective wheel coincides with the centerline of the machine, to properly align the centers of the wheel of the two-wheel set with the centerline of the apparatus regardless of any difference of the diameters of the wheels or of any asymmetrical load acting on the axle of the wheel set. The lifting devices preferably include hydraulic operated cylinder-and-piston means and during the lifting operation streams of fluid of substantially identical volume per time unit are fed into the cylinders of the cylinder-and-piston means so that the position of the wheel set during the lifting thereof will not be changed.

According to a further preferred feature of the present invention, the feeding of fluid into the cylinders of the two separate lifting devices is initiated by a single starting signal, whereas the lifting movement produced by each of the lifting devices is stopped exclusively upon coinciding of the center of the respective lifted wheel with the centerline of the apparatus. The two independent lifting devices will therefore start their upward movement simultaneously and will at least substantially synchronously move in upward direction, but stopping of the upward movement of the two lifting devices will occur completely independent from each other and be controlled respectively by the centralizing or sensing device coordinated therewith.

It is a further object of the present invention to provide in a wheel set turning machine an arrangement for carrying out the above method.

It is therefore also an object of the present invention to provide in a wheel set turning machine at the head stock side as well as on the tail stock side separate lifting means respectively engaging only one wheel of the two-wheel set for lifting the wheels of the wheel set, and a pair of sensing means respectively coordinated with the lifting means for sensing the moment at which the center of each wheel during the lifting thereof by the lifting means coincides with the centerline of the machine and for stopping the lifting movement of each lifting means, independent from the other, when the center of the respective wheel coincides with the centerline of the machine.

Preferably each of the lifting means comprises a hydraulically operated cylinder-and-piston means and the cylinders of the hydraulically operated cylinder-and-piston means have substantially the same dimensions for receiving the hydraulic fluid medium.

The machine may include also rail means for moving the wheel set into the machine, and arresting means for arresting the wheel set along the rail means in a position in which the centers of the wheels are located below and in a vertical plane including the centerline of the machine.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
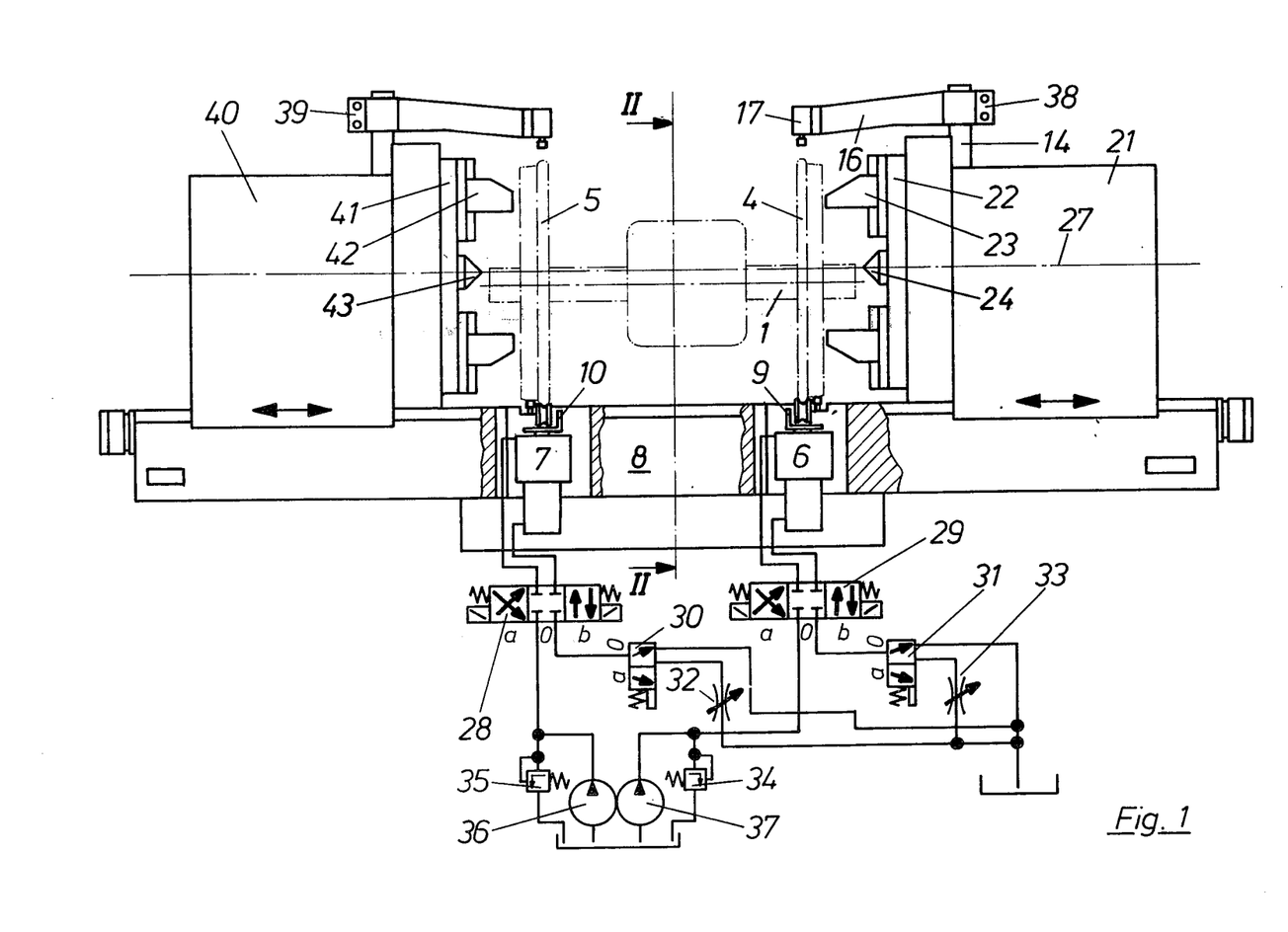
FIG. 1 is a partly schematic, partly sectioned side view of a wheel set turning machine provided with an arrangement for carrying out the method according to the present invention.
Figure 2:
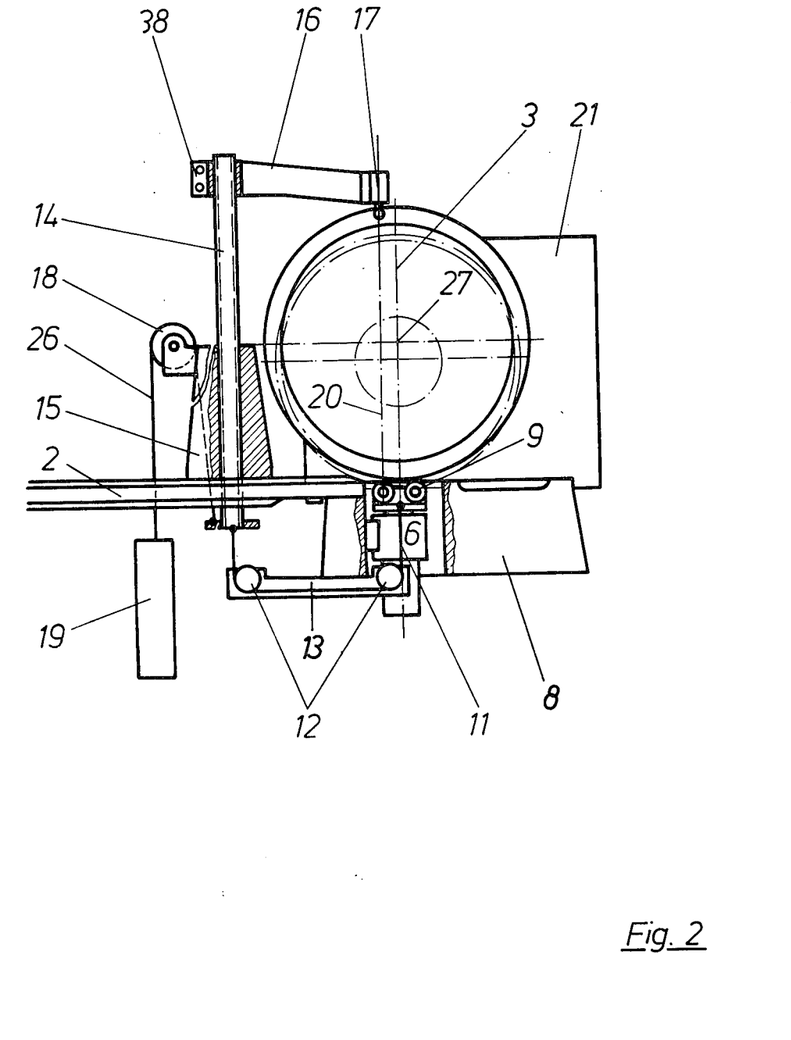
FIG. 2 is a partly sectional side view taken along the line II—II of FIG. 1.
Figure 3:
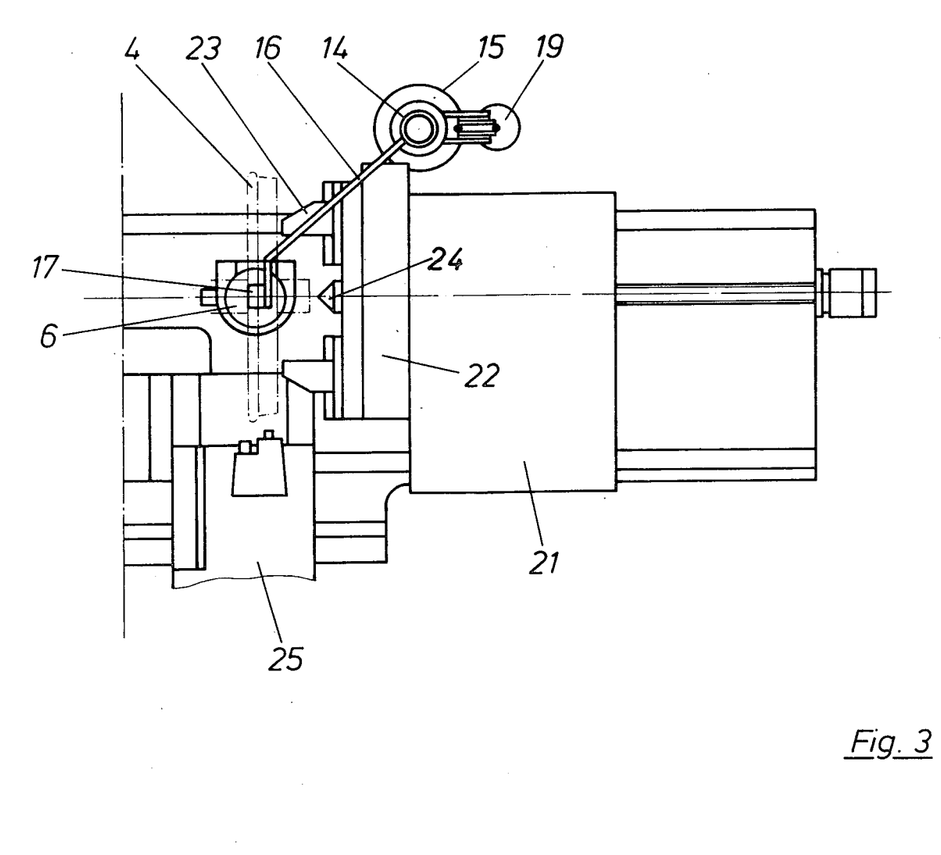
FIG. 3 is a top view of half of the machine shown in FIG. 1.

FIGS. 1-3 illustrate a wheel set turning machine of the roll-in roll-out type, respectively roll-through type, which is provided with an arrangement for carrying out the method according to the present invention. A wheel set 1 rolling into the machine along the rails 2 is braked and brought to standstill, by a suitable arrangement as for instance disclosed in the DT-PS No. 2,223,533, in a position in which the centerline of the wheel set is located in a vertical plane 3 (FIG. 2) including the centerline of the machine passing through the dead centers 24 and 43 respectively provided on the tail stock 21 and the head stock 40.

Figure 4:
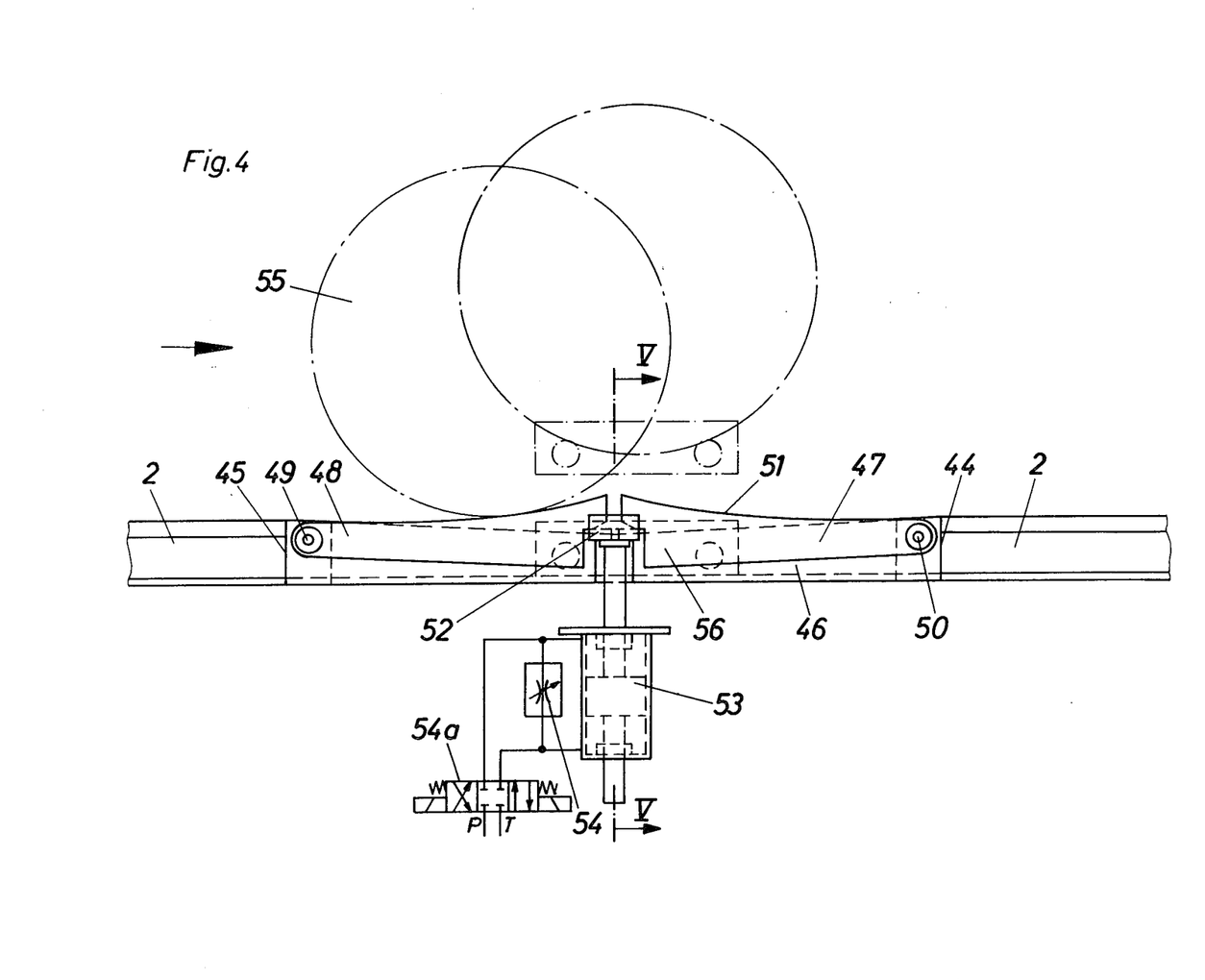
FIG. 4 is a schematic side view of an arrangement for arresting a wheel set moving into the machine of FIG. 1 in a predetermined position.
Figure 5:
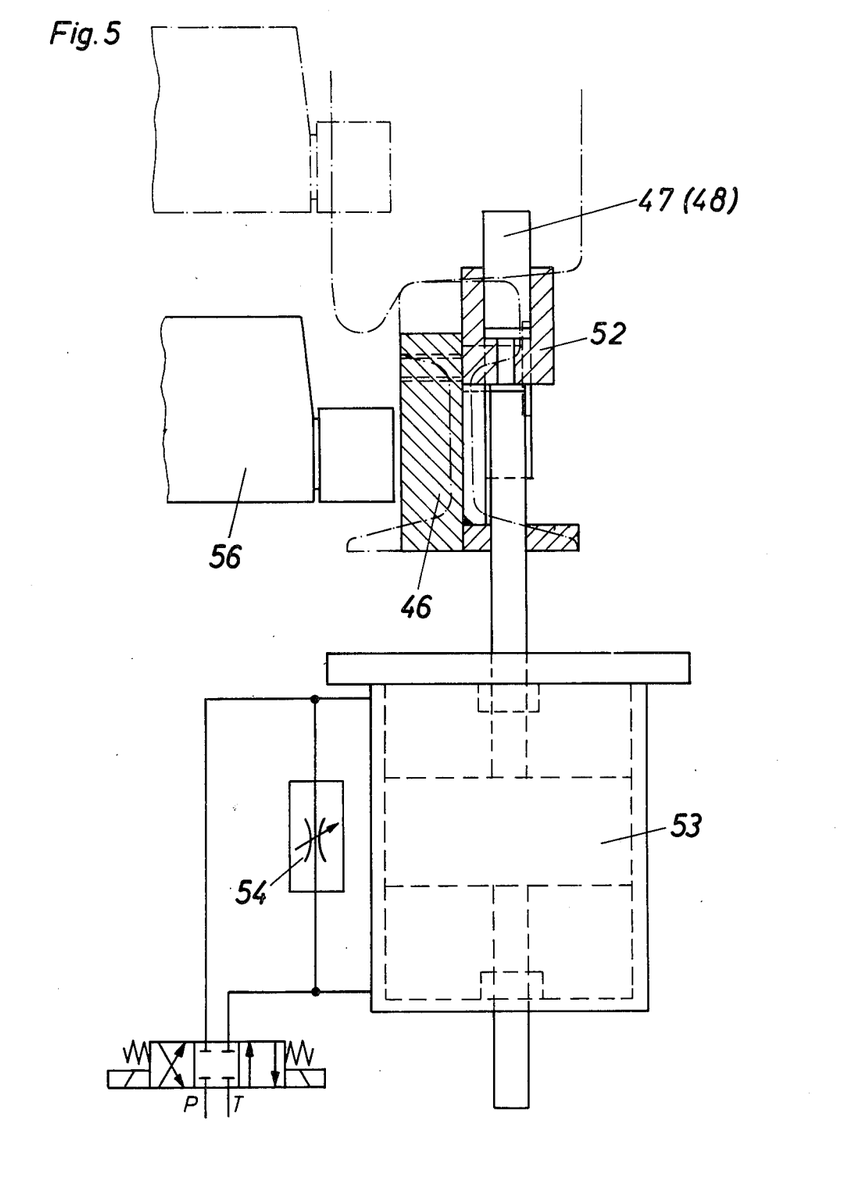
FIG. 5 is a section taken along the line V—V of FIG. 4.

Essential parts of the arrangement disclosed in the aforementioned German patent are schematically illustrated in FIGS. 4 and 5. As shown therein the rails 2, of which only one is shown in FIGS. 4 and 5, for rolling a wheel set into the machine illustrated in FIG. 1, are interrupted at 44 and 45 and a catching device is mounted into the thus-produced gap, which serves to arrest the wheel set, rolling in on the rails 2, at a predetermined position in the machine and to let the wheel set after machining thereof roll further, either in direction of the original rolling direction, or opposite thereto. The gap between the two ends 44 and 45 of each of the rails 2 is filled by a fixed rail 46, the upper surface thereof is downwardly inclined toward the center of the gap and serves as a guide rail for the inrolling wheel set. Catch levers 47, respectively 48, are tiltably mounted at pivot pins 49 and 50 adjacent to the ends 44 and 45 of the rails 2 on the respective rail 46 bridging the respective gap. The levers 47 and 48 are connected to the rail 46 in such a manner that their upper faces thereof adjacent the pivot pins are located below the upper faces of the rails 46, while rising along a gradually increasing curvature toward the center of the gap up to twice the height of the rim of the wheels of the wheel set. Both levers 47 and 48 are supported at its free ends by common fork 52, which, in turn, is supported and moved by hydraulically operated cylinder-and-piston means 53. Thereby the hydraulically operated cylinder-and-piston means serves as a damper in that the cylinder spaces located on opposite sides of the piston of the cylinder-and-piston means 43 are connected to each other by a throttle 54, as well as an ejector when the bottom face of the piston is impinged by pressure fluid.

The wheel set 55, rolling in the direction of the arrow shown in FIG. 4 rolls up on the curved upper face of the levers 48 until it has lost his rolling energy to be then lowered by the cylinder-and-piston means 53 acting as a damper. The wheel set rolls then on the downwardly inclined surface of the fixed rails 46 up to the lowest point of the latter to remain there at standstill. The necessary control signals for the control valve 54a of the cylinder-and-piston means 53 may be produced manually in a known manner or from a central control stand of the machine.

According to the prior art the wheel set 55 is in its arrested position lifted by a central lifting device 56. This known art of lifting the wheel set has the already described disadvantages. According to the present invention the wheel set is lifted in such a manner to obviate the mentioned disadvantages. According to the present invention there is provided below each wheel 4, respectively 5 of the wheel set 1, a lifting device 6, respectively 7, arranged in the machine bed 8. Each of the lifting devices 6 and 7 is provided with a lifting head 9, respectively 10, which carries a pair of rollers arranged symmetrically to opposite sides of a vertical plane of symmetry including the axis of the wheel set and which respectively engage for instance the rims of the wheels 4 and 5 of the wheel set 1 during the upward movement of the lifting heads, to thus move the wheels 4 and 5 in upward direction. Instead of the rollers, prisms or other suitable means may also be used. As shown in FIG. 2, the lifting head 9 is connected with a flexible pulling element 11, which is deflected over deflecting rolls 12, mounted on a stationary arm 13, and connected to the lower end of a tube 14. An additional flexible pulling element 26, connected to the lower end of the tube 14, passes over a deflecting roll 18 and carries a counterweight 19. The tube 14 is guided for movement in longitudinal direction in an upright stationary support 15, while being prevented, by known means not shown in th drawing, from turning about its axis. The tube 14 carries at its upper end a laterally extending arm 16, the position of which is adjustable in longitudinal direction of the tube, and which carries at its free end a limit switch 17. This limit switch is thereby arranged in a vertical sensing plane 20 which includes the axis of one of the rollers provided on the head 9. If the head 9 of the lifting device 6 is now moved upwardly, then the tube 14 is constrained by the flexible pulling element 11 to move in downward direction. Thereby the contact point of the limit switch 17 and the point of engagement of the roller opposite to the limit switch with the respective wheel move with the same speed in a pincer-like movement towards each other. At the head stock side 40, the mentioned machine elements comprising the sensing means 39 and the lifting device 7 cooperate with each other. At the start of the operation the distance of the mentioned contact points from the horizontal plane passing through the dead centers 24 and 43 have to be the same so that a wheel lifted in this manner is necessarily brought to a position in which the center of the respective wheel coincides with the centerline 27. Actually, the operating button of the limit switch 17 is preferably at the start of operation slightly closer to the centerline 27 than the contact point of the corresponding roller on the lifting device 7, so that this switch upon its first engagement with the wheel 5 will first switch off the rapid traverse movement of the lifting head and subsequently thereto, when the wheel reaches its properly centered position, completely stop the upward movement of the lifting head. As shown in FIG. 1, the other half of the machine is, at last as far as the lifting and sensing device is concerned, mirror-symmetrical with respect to the above-described. At the tail stock 21 the wheel 4 of the wheel set 1 is lifted, by the lifting head 9 of the lifting device 6 in the described manner to the centerline 27 of the wheel set turning machine. On the side of the tail stock 21 the mentioned machine parts, that is the sensing device 38 cooperates with the lifting device 6 to move the wheel 4 to the desired centralized position. It is obvious that the positioning of the two wheels 4 and 5 of a wheel set 1 to the centerline 27 of the machine will occur completely independent of the diameters of the two wheels. After the two wheels are thus properly positioned with regard to the centerline 27, the dead centers 23 and 43 of the tail stock 21 and the head stock 40 are moved toward each other until the two centers properly engage into the conical center bores at the opposite ends of the shaft of the wheel set, so that the latter is now held between the two dead centers. Subsequently thereto the tail stock and the head stock are moved toward each other until the entrainment means or clamps 23, respectively 42 on the two face plates 22 and 41 are in the position to clamp the wheels of the wheel set in radial and axial direction. After the clamping, the entrainment means are hydraulically blocked, in a known manner, whereby the position of the two wheels 4 and 5 are fixed in the turning machine. The lifting devices 6 and 7 are then moved downwardly and the tool support 25, shown in FIG. 3, is moved in radial inward direction so that the reprofiling of the wheels can be started.

During the lifting of the wheel set 1 by the two lifting devices 6 and 7 it is preferred that the two lifting devices move with substantially the same speed in upward direction. This can be accomplished in a simple manner if the cylinders and the piston rods of the two lifting devices 6 and 7 are of the same dimensions and that pressure fluid streams of the same volume per time unit are fed into the cylinders by the pumps 36 and 37 respectively coordinated therewith. In order to assure a simultaneous start of the upward movement of the two lifting devices 6 and 7, the two electromagnetically operated control valves 28 and 29 are brought to their position a by a common control signal. Such a control signal may be manually operated by a single switch connected in circuit with the electromagnetically operated control valves, or if the cycle of operation of the machine is to be automatically controlled, this signal may also be produced by a switch in circuit with the two control valves 28 and 29 and actuated when the wheels during rolling in of the apparatus reach a predetermined end position. These switches and the circuit arrangement connecting the switches with the control valves 28 and 29 are for simplification reason not shown in the drawing, since such switches and circuit arrangements are evidently well known in the art. In the position a of the control valves 28 and 29, pressure fluid is fed from the pump 37 into the cylinder of the lifting device 6 and a corresponding pressure fluid stream is fed from the pump 36 into the cylinder of the lifting device 7. Both lifting devices will now move, regardless whether different loads are acting thereon with at least substantially identical speeds in upward direction. Each of the limit switches 17 mounted on the arms 16 has two switching positions. The operating button or feeler of each limit switch 17 will come in contact with the respective wheel 4 and 5 of the wheel set 1 shortly before the wheel set reaches the desired centralized position and at a first contact of the operating buttons of the limit switches 17 they will respectively switch, by a circuit arrangement well-known in the art and therefore not illustrated in the drawing, the corresponding control valves 31 and 32 to the position $a$, so that the pressure fluid streams flowing out from the upper compartments of the cylinders of the lifting devices 6 and 7 will flow over the throttles 32 and 33 respectively, so that the speed of the further upward movement of the lifting heads 9 and 10 will be reduced. When the wheels 4 and 5 reach the desired centralized position, the limit switches 17 will provide a second impulse, which moves the control valves 28 and 29 respectively to their zero positions, so that further upward movement of the lifting heads 9 and 19 is stopped. By the provision of the further control valves 30 and 31 and the throttles 32 and 33 connected therewith an undesired movement beyond the centralized position, due to high upward speed of the lifting heads 9 and 10, is avoided. In the zero position of the two control valves 28 and 29 any pressure fluid pumped by the pumps 36 and 37 will flow over the overpressure valves 34 and 35 back to the tank. In order to move the lifting heads 9 and 10 in downward direction, the two control valves 28 and 29 are moved by a control signal to their position $b$, whereas the additional control valves 30 and 31 are moved to the zero position.

The use of the method according to the present invention is not limited to wheel set turning machines, nor is a wheel set turning machine as illustrated and described by way of example limited for carrying out the method according to the present invention. Furthermore, the necessary sensing devices must not correspond to the above-described construction. It is also possible to use sensing devices as they are for instance disclosed in the German Pat. No. 1,087,429 or in the German Pat. No. 1,003,008.

Figure 6:
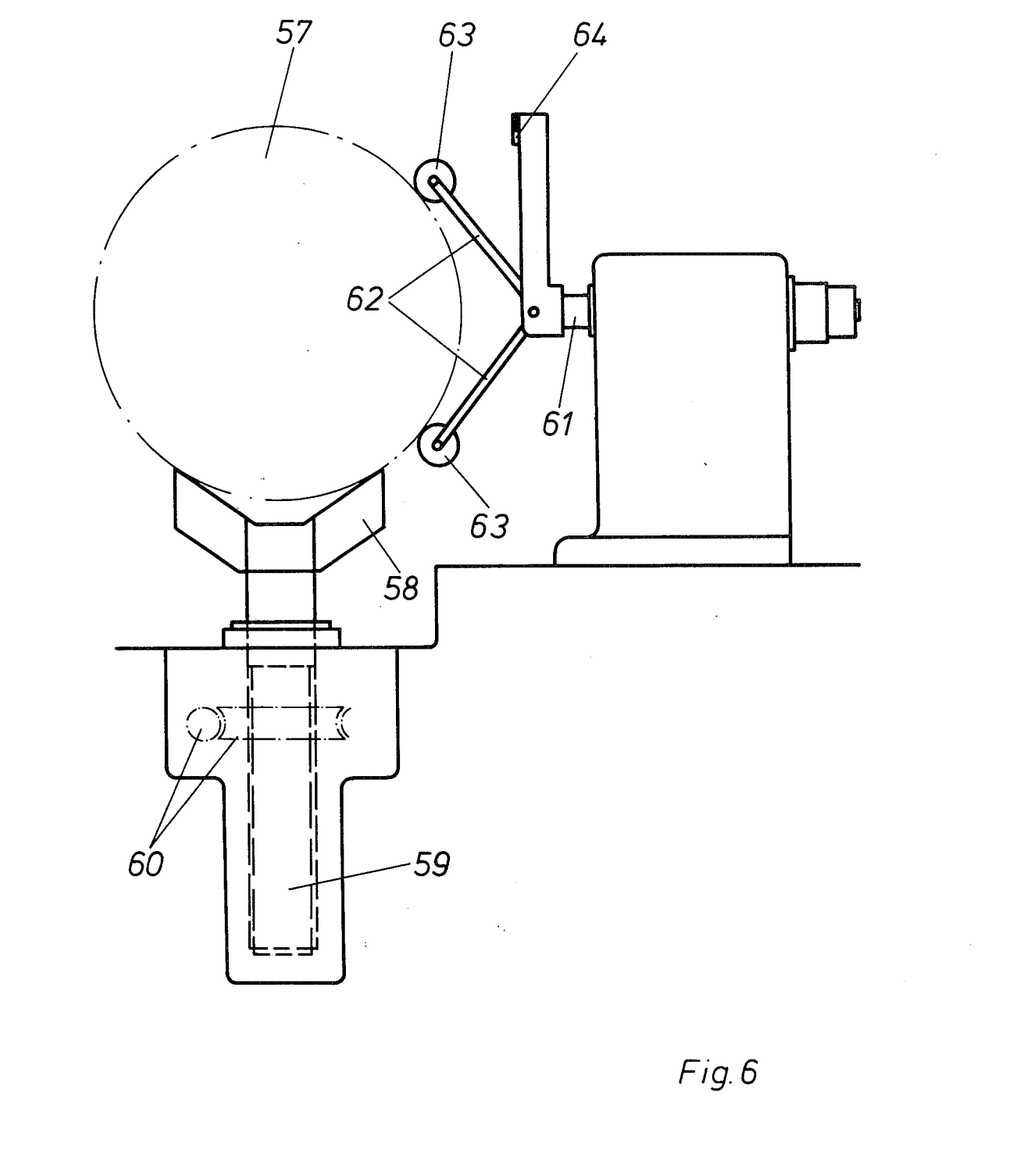
FIG. 6 is a schematic side view of a different sensing means which may be used in the apparatus shown in FIG. 1.

The sensing or centralizing device according to the German Pat. No. 1,003,008 is illustrated by way of example schematically in FIG. 6. This centralizing arrangement has been originally constructed for the centralizing of round blocks in a turning machine. The construction and function for the centralizing of round blocks is as follows:

The round block 57 rests on a support prism 58 which is height-adjustable by a spindle 59. The spindle 59 is driven by a worm gearing 60. The support prism 58 is arranged vertically below the turning axis of the machine. A tiltable bracket 62 with legs of equal lengths, provided at the free ends thereof preferably with rollers 63, is mounted on the front end of a radially adjustable slide bar 62, the axis of which coincides with the turning axis of the machine. The tiltable bracket 62 is arranged on the slide bar 61 elastically yieldable in axial direction of the latter, in a manner not illustrated in the drawing. Connected with the tiltable bracket 62 is an indicator device 64, through which the zero position of the bracket 62 can be determined, that is the position of the latter in which the two legs thereof include the same angle with the axis of the slide bar 61. Until the indicator device 64 indicates this zero position, the indicator device will actuate, electrically or hydraulically, in a manner known per se, the worm gear drive 60 to cause thereby a height adjustment of the spindle 59 and the support prism 59 connected thereto.

The above-described arrangement will be operated as follows:

At the start of operation the support prism 58 will be in its lowermost position. The cylindrical block 57 is then placed onto the support prism 58 and the latter will be moved upwardly by actuating the drive 60, approximately to the desired centralized position. The tiltable bracket 62 is then moved by the adjustable slide bar 61 toward the cylindrical block 57 so that the rolls 63 at the ends of the legs of the brackets 62 will come in contact with the peripheral surface of the block 57. Thereby the bracket 62 will be deflected into a certain angular position, if the block 57 is not accidentally brought into the correct central position. The elevation of the support prism 58 is then further adjusted until the indicator 64, which is driven by the tiltable bracket 62, reaches its zero position. At this moment the cylindrical block 57 has reached its centralized position and may be supported by the dead centers of a machine, not illustrated in FIG. 6.

Figure 7:
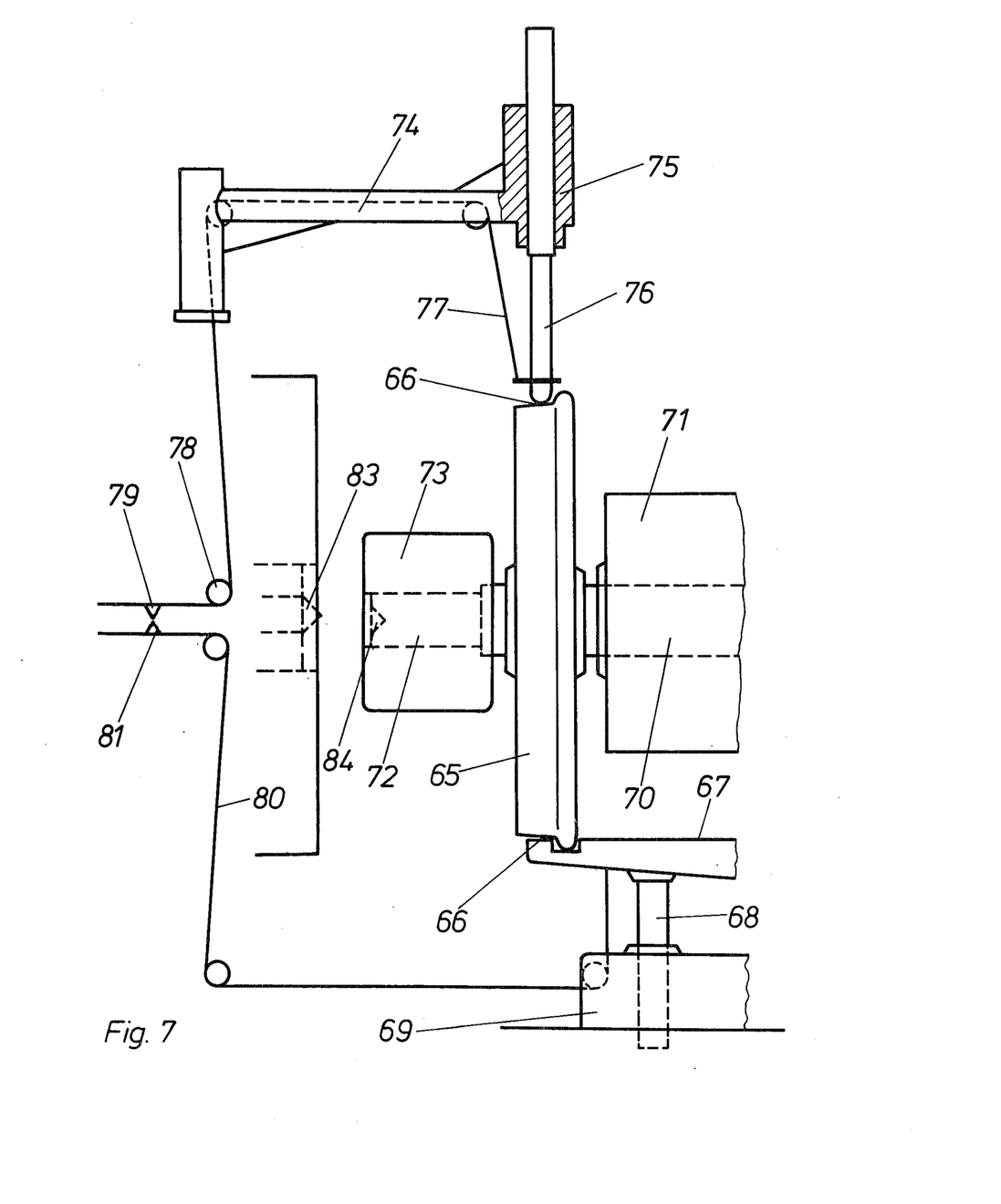
FIGS. 7-9 schematically illustrate in a side view a further sensing device which may be used in connection with the apparatus shown in FIG. 1.
Figure 9:
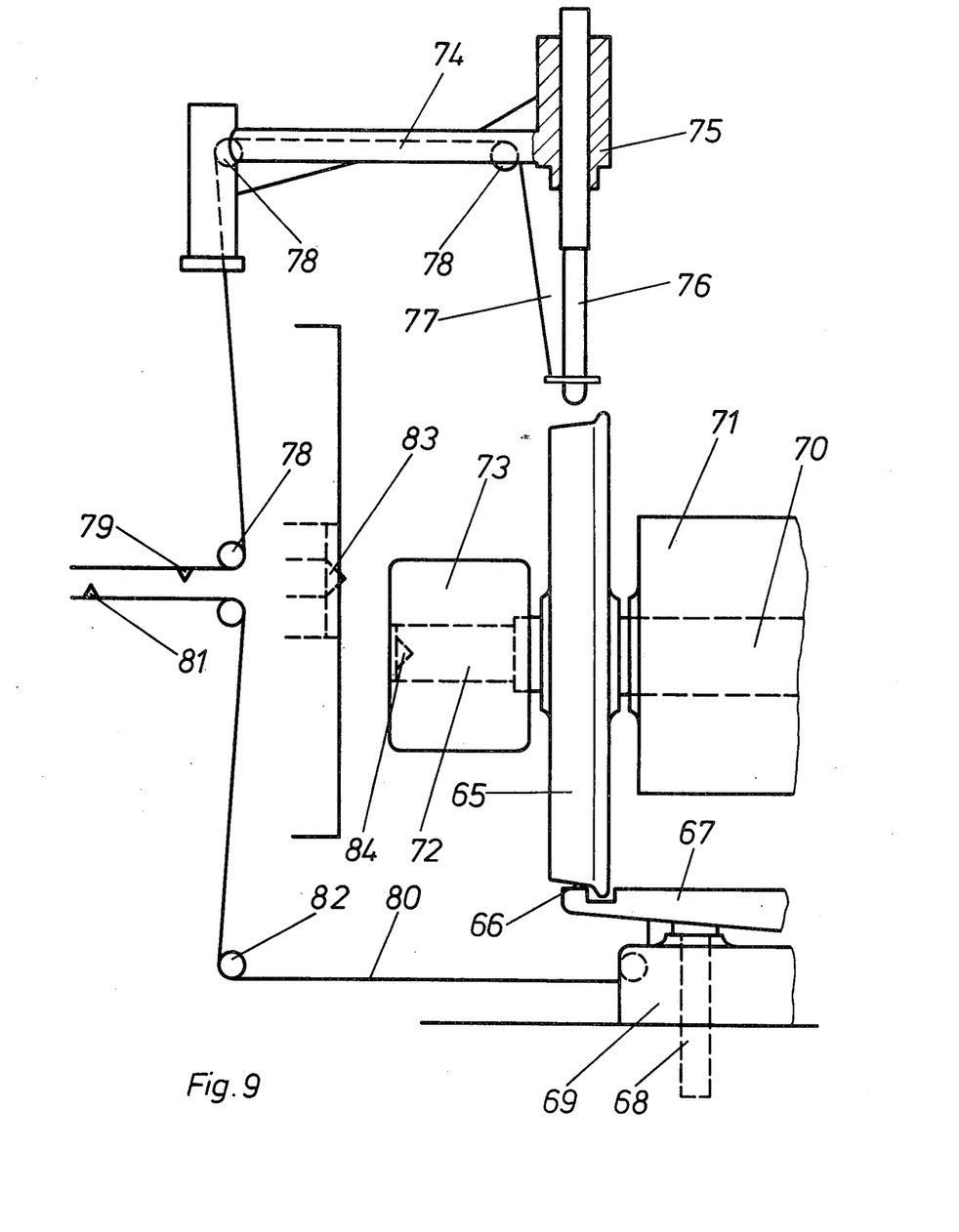

In order to use the above-described arrangement disclosed in the German Pat. No. 1,003,008 to carry out the method according to the present invention, it would be necessary to provide two separate supporting prisms 58, for respectively supporting the wheels of a two-wheel set as illustrated in FIG. 1, each provided with its own drive 60 and to coordinate with each support prism 58 and the drive 60 for moving the same, a sensing or centralizing device comprising the elements 62, 63 and 61, 64 as described above, for controlling the drives 60 for the two supporting prisms 58 independent from each other. The centralizing arrangement according to the German Pat. No. 1,087,429 operates according to a method which differs from that described above. FIGS. 7 and 19 schematically illustrate half of a wheel set turning machine with a single lifting device for the wheel set. It is further pointed out that the device for sensing the elevation of the wheel set, shown above the latter, is in the construction as disclosed in the German Pat. No. 1,087,429 provided only at one side of the machine. The arrangement disclosed in the last-mentioned German patent will operate as follows:

The two wheels of a wheel set, of which only the wheel 65 is shown in the drawing, abut with their tread surfaces 66 on a single traverse 67, the elevation of which is adjustable by means of two pistons 68, only one of which is again shown in the drawing, which are guided in a support 69. The pistons 68 serve at the same time as guide rods and prevent a tilting of the traverse 67. A motor housing 71 may for instance be fastened to the axle 70 of the wheel set between the wheels of the latter whereas the portions 72 of the axle projecting beyond the wheels carry bearings 73, of which again only one is illustrated. A guide 75 for a feeler 76 is provided on one end of an arm 74 which is mounted turnable at the other end about a vertical axis. After a wheel set is placed on the traverse 67 the arm 74 is turned about the vertical axis so that the feeler 76 is placed into a vertical plane of symmetry including the axis of the wheel set to be held in this position. The feeler 76 is initially located in its lowermost position and so is the traverse 67. A cable 77 connects, over reversing rollers 78, the feeler 76 with a contact 79. A further cable 80, connected to the traverse 67, is guided over rollers 82, and carries an additional contact 81. In the initial position, as illustrated in FIG. 9, the two contacts 79 and 81 are separated from each other. During lifting of the traverse 67, the feeler 76 comes in contact with the wheel 65 and will be lifted by the latter. During upward movement of the traverse 67 and lifting of the feeler 76, the two contacts 79 and 81 move toward each other, to come in contact with each other when the wheel set is aligned with the central axis of the turning machine. At this moment the lifting device for the traverse 67 is automatically stopped, by means well-known in the art and therefore not illustrated in the drawing, so that the dead centers 83 may be moved into the corresponding conical center bores 84 of the shaft of the wheel set.

Figure 8:
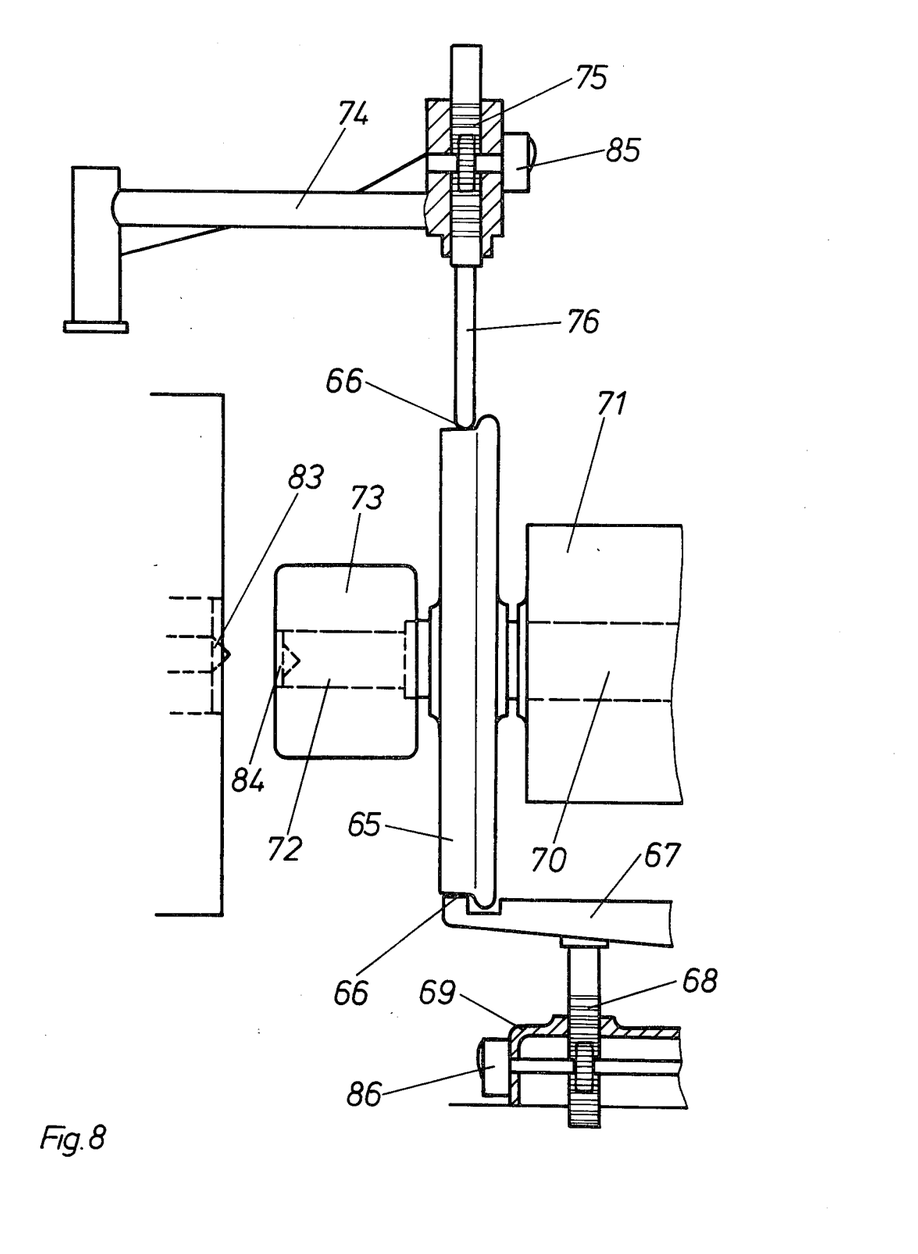

FIG. 8 schematically illustrates a slightly modified arrangement in which, instead of the two cables 77 and 80 respectively connected to the feeler 76 and the traverse 67, and the contacts 79 and 81 carried thereby, two potentiometers 85 and 86 are provided, to be respectively driven by the feeler 76 and one of the piston 68, in which the potentiometers at coincidence of their deflections will stop the upward movement of the lifting piston 68.

The arrangement as above-described and as disclosed in the last mentioned German patent will evidently have the drawbacks and shortcomings as initially mentioned of known prior-art constructions. However, the last-described arrangements could also be used for carrying out the method according to the present invention, provided that a separate lifting device is used for each wheel of the wheel set and a separate feeler and elements cooperating therewith is coordinated with each of the two lifting devices, so that each wheel of the wheel set may be properly centralized regardless of any differences in the diameters of the two wheels, or differences of the loads acting thereon.

In principle any centralizing or sensing device, able to transmit to the lifting device coordinated therewith the necessary travel information for the proper positioning of the respective wheel of the wheel set, may be used. It is also not necessary or essential for the invention that the lifting devices 6 and 7 as shown in FIG. 1 are constructed as illustrated in the drawing. According to the invention it is only necessary that a separate lifting device is provided for each wheel of the wheel set to be positioned and that a separate centralizing or sensing device is coordinated with the respective lifting device, to transmit to the lifting device coordinated therewith the necessary travel information and that each lifting device is operated independent from the other lifting device. The use of the method according to the present invention makes it possible at the first time to centralize a wheel set exactly to the centerline of measuring-, testing- or turning-apparatus, independent from any eventually existing difference of the diameters of the two wheels of the wheel set and/or independent from an asymmetrical loading of the wheel set. The advantages of the present invention are especially pronounced by carrying out the method of the present invention in a wheel set turning machine herein described by way of an example. By use of the present invention, not only damage of the conical center bores and the dead centers of the machine cooperating therewith, such as occurs in methods according to the prior art, is completely avoided, but during reprofiling of the wheels of a wheel set on a turning lathe a better correction of any diameter difference of the two wheels of a wheel set, as well as a better correction of the profiles of the two wheels may be obtained. Faulty clamping, occurring often during the use of methods or apparatus according to the prior art, for instance by moving the wheel set too high or by moving one side of the wheel set to a different elevation than the other side will result in overloading of the dead centers, the clamps, the face plate and therewith the main spindle as well as the spindle bearing of the machine, which in turn will result in an increased wear and therewith a premature loss of the desired machining exactness. By use of the present invention also these disadvantages are completely avoided.

It will be understood that each of the elements described above, or two or more together, may also find a useful application in other types of method and apparatus for centralizing the two wheels of a wheel set with the centerline of a machining-, measuring-, or testing-apparatus differing from the types described above.

While the invention has been illustrated and described as embodied in a method and apparatus for centering the wheels of a two-wheel set with the centerline of a machining-, measuring-, or testing-apparatus in which a separate lifting device is provided for each wheel of the set and in which a separate sensing or centralizing device is coordinated with each of the separate lifting devices, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. In an arrangement for centering a two-wheel set along a horizontal center line of a machine, a combination comprising a pair of vertically movable lifting means respectively engaging the wheels of the two-wheel set at bottom portions thereof; a pair of vertically movable sensing means respectively coordinated with said pair of lifting means and respectively arranged for engaging the wheels of the set substantially opposite said portions which are engaged by said lifting means; and means cooperating with at least one of the first-mentioned two means for stopping the lifting movement of the respective lifting means, independent of the other, when the center of the respective wheel coincides with said center line.

2. A combination as defined in claim 1, wherein each of said lifting means comprises a pair of rollers arranged symmetrically with respect to a vertical plane including said center line and wherein each of said sensing means is arranged in a vertical plane including the axis of one roller of the respective lifting means, each of said sensing means having a lower contact point and each of said one roller having an upper contact point spaced the samd distance from said center line; transmission means between each of said lifting means and the sensing means coordinated therewith for moving the latter in vertical direction and through the same distance but in opposition to the direction of movement of said lifting means; said means for stopping the lifting movement of the respective lifting means, independent of the other, comprising a pair of switch means respectively coordinated with said sensing means.

3. A combination as defined in claim 2, wherein said lower contact point of each of said sensing means is constituted by an operating point of a limit switch constituting the respective switch means.

4. A combination as defined in claim 3, wherein each of said lifting means comprises hydraulically operated cylinder-and-piston means.

5. A combination as defined in claim 4, wherein the cylinders of said hydraulically operated cylinder-and-piston means have substantially the same dimensions.

6. A combination as defined in claim 5, and including valve means for each of said cylinder-and-piston means and coordinated with the limit switch of the respective sensing means for controlling feeding of hydraulic pressure fluid into the respective cylinder-and-piston means.

7. A combination as defined in claim 6 wherein each limit switch has two switching positions and including additional fluid stream regulating means for reducing the amount of pressure fluid fed into the respective cylinder-and-piston means respectively coordinated with each of said limit switches to be actuated by one of the two switching positions of each limit switch shortly before the respective sensing means indicates coincidence of the center of the respective wheel with said centerline, whereas in the other switching position the respective limit switches actuates the respective valve means for stopping further feeding of pressure fluid into the respective cylinder-and-piston means.

8. A combination as defined in claim 1, wherein each of said sensing means has a lower contact point engaging the respective wheel so that each contact point moves upwardly and through the same distance as a respective lifting means during upward movement of the latter, and wherein said means for stopping the lifting movement of the respective lifting means, independent from the other, comprises a pair of means respectively coordinated with each of said lifting means and the sensing means cooperating therewith.

9. A combination as defined in claim 8, wherein said last-mentioned means comprises a pair of contacts initially spaced from each other and means connecting said contacts to the respective sensing means and the lifting means for moving said contacts toward each other through equal distances during movement of the respective lifting means and the sensing means cooperating therewith.

10. A combination as defined in claim 8, wherein said last-mentioned means comprises a pair of potentiometers respectively cooperating with the respective lifting means and the sensing means cooperating therewith.

11. In an arrangement as defined in claim 1, wherein said machine comprises a tail stock and a head stock movable toward and away from each other and each provided with a centering element for receiving a two-wheel set along the center line of the machine between the centering elements, and including rail means for moving the wheel set into the machine and arresting means for arresting the wheel set along the rail means in a position in which the center line of the wheel set is located below and in a vertical plane including the center line of the machine.

* * * * *